（12） United States Patent
Bush et al.

(10) Patent No.: US 9,222,584 B2
(45) Date of Patent: Dec. 29, 2015

(54) RIGID PISTON RETROFIT FOR A DIAPHRAGM FLUSH VALVE

(71) Applicant: SDB IP Holdings, LLC, Oviedo, FL (US)

(72) Inventors: Shawn D. Bush, Orlando, FL (US); Ryan W. Nottage, Winter Springs, FL (US)

(73) Assignee: SDB IP Holdings, LLC, Oviedo, FL (US)

( * ) Notice: Subject to any disclaimer, the term of this patent is extended or adjusted under 35 U.S.C. 154(b) by 62 days.

(21) Appl. No.: 13/832,758

(22) Filed: Mar. 15, 2013

(65) Prior Publication Data

US 2013/0277581 A1    Oct. 24, 2013

Related U.S. Application Data

(60) Provisional application No. 61/636,174, filed on Apr. 20, 2012.

(51) Int. Cl.
*F16K 31/12*    (2006.01)
*F16K 3/24*    (2006.01)
*F16K 31/383*    (2006.01)
*B23P 6/00*    (2006.01)

(52) U.S. Cl.
CPC . *F16K 3/243* (2013.01); *B23P 6/00* (2013.01); *F16K 31/3835* (2013.01); *Y10T 29/49407* (2015.01)

(58) Field of Classification Search
CPC ....... F16K 3/243; F16K 31/3835; B23P 6/00; Y10T 29/49407
USPC ....... 251/40, 33, 37, 38, 43; 92/103 F, 103 M
See application file for complete search history.

(56) References Cited

U.S. PATENT DOCUMENTS

| 1,573,092 | A | * | 2/1926 | Russell | 251/21 |
|---|---|---|---|---|---|
| 1,714,573 | A | | 5/1929 | Sloan | |
| 1,756,263 | A | | 4/1930 | Sloan | |
| 1,830,005 | A | | 11/1931 | Sloan | |
| 1,868,591 | A | | 7/1932 | Tanner | |
| 1,878,001 | A | * | 9/1932 | Sloan | 251/35 |
| 1,964,111 | A | | 6/1934 | Dobrick | |
| 2,007,652 | A | | 7/1935 | Kocour | |
| 2,066,086 | A | * | 12/1936 | Wilson | 251/40 |
| 2,153,904 | A | | 4/1939 | Wilson | |
| 2,406,259 | A | * | 8/1946 | Russell et al. | 137/375 |
| 2,872,150 | A | * | 2/1959 | Philippe | 251/40 |
| 4,202,525 | A | * | 5/1980 | Govaer et al. | 251/40 |
| 4,261,545 | A | * | 4/1981 | Allen | 251/40 |
| 4,327,891 | A | | 5/1982 | Allen et al. | |
| 4,793,588 | A | | 12/1988 | Laverty, Jr. | |
| 4,987,920 | A | | 1/1991 | Donner | |
| 5,169,118 | A | | 12/1992 | Whiteside | |
| 5,195,720 | A | | 3/1993 | Nortier et al. | |
| 5,232,194 | A | * | 8/1993 | Saadi et al. | 251/40 |
| 5,269,333 | A | | 12/1993 | Richmond | |
| 5,271,600 | A | * | 12/1993 | Saadi et al. | 251/40 |
| 5,415,374 | A | * | 5/1995 | Carroll et al. | 251/40 |

(Continued)

*Primary Examiner* — John K Fristoe, Jr.
*Assistant Examiner* — Umashankar Venkatesan
(74) *Attorney, Agent, or Firm* — The Webb Law Firm

(57) ABSTRACT

A rigid piston assembly for use in a conventional flush valve includes a rigid piston configured to fixedly engage within the valve body. The present invention is also directed to a flush valve for a plumbing fixture as well as a method of retrofitting a rigid piston into a diaphragm flush valve body.

30 Claims, 13 Drawing Sheets

(56) References Cited

U.S. PATENT DOCUMENTS

| | | | |
|---|---|---|---|
| 5,476,244 A * | 12/1995 | Carroll et al. | 251/40 |
| 6,019,343 A | 2/2000 | Tsai | |
| 6,382,586 B1 | 5/2002 | Wilson et al. | |
| 6,408,873 B1 | 6/2002 | Hall et al. | |
| 6,926,247 B2 | 8/2005 | Nortier | |
| 6,959,905 B2 | 11/2005 | Bush | |
| 7,028,975 B2 | 4/2006 | Lee et al. | |
| 7,487,950 B2 * | 2/2009 | Johnson | 251/40 |
| 2001/0032947 A1 | 10/2001 | Freisinger et al. | |
| 2003/0020032 A1 | 1/2003 | Nortier | |
| 2004/0056223 A1 | 3/2004 | Wilson et al. | |
| 2004/0164261 A1 | 8/2004 | Parsons et al. | |
| 2004/0232370 A1 | 11/2004 | Parsons et al. | |
| 2007/0272887 A1 * | 11/2007 | Carroll et al. | 251/40 |
| 2008/0078014 A1 | 4/2008 | Wilson et al. | |
| 2009/0039299 A1 | 2/2009 | Wilson | |
| 2009/0072177 A1 | 3/2009 | O'Connor | |
| 2011/0037011 A1 | 2/2011 | Maercovich et al. | |
| 2011/0155934 A1 | 6/2011 | Guler et al. | |

\* cited by examiner

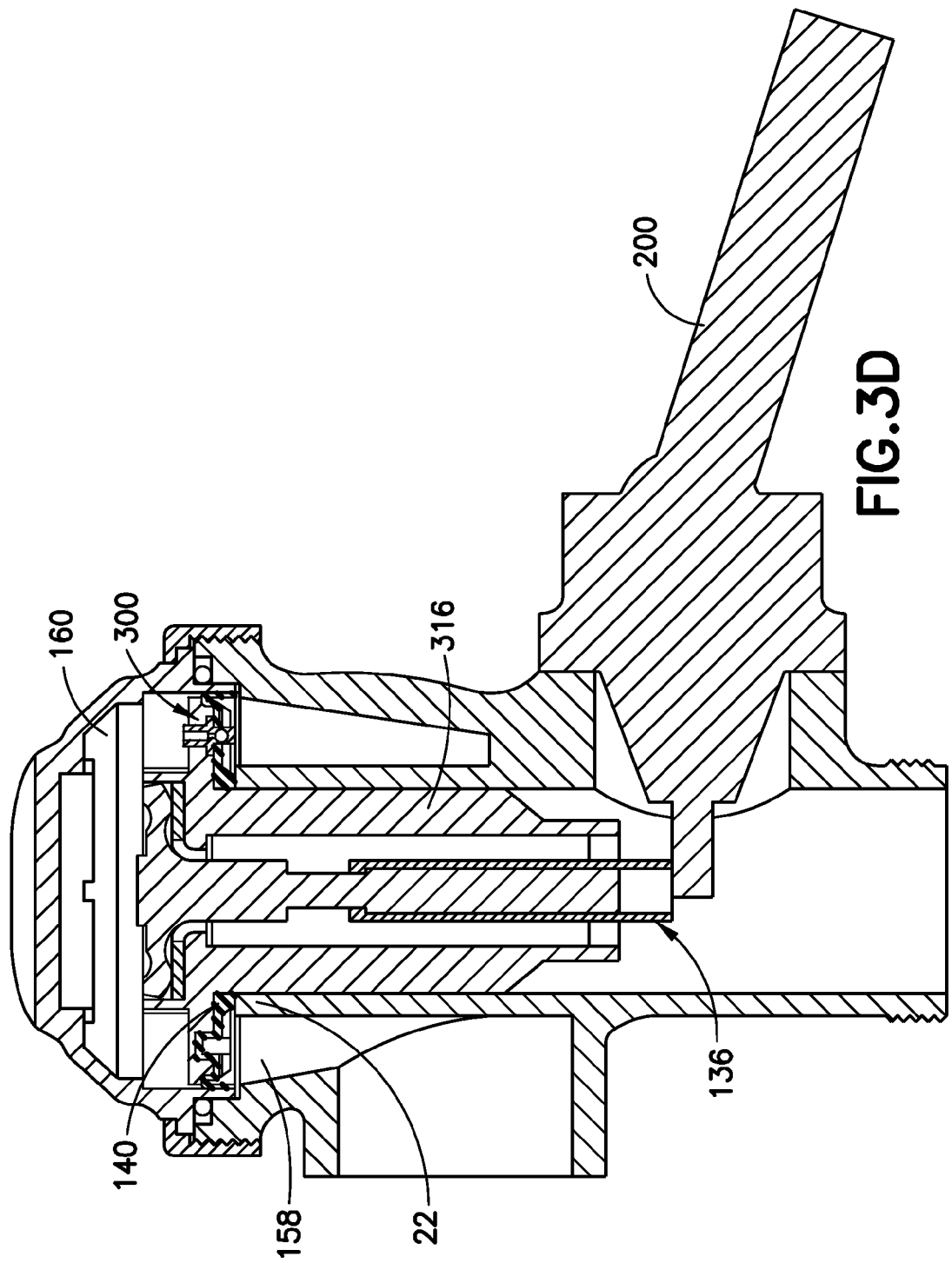

RIGID PISTON RETROFIT FOR A DIAPHRAGM FLUSH VALVE

BACKGROUND OF THE INVENTION

1. Field of the Invention

The present invention relates generally to flush valves and, in particular, to a rigid piston for use in a flush valve.

2. Description of Related Art

Valves are used throughout many fluid transfer systems and in various applications, such as in the transfer and control of water conduit systems, and, in particular, in connection with plumbing fixtures in both residential and commercial settings. For example, flush valves are typically used for control and operation of toilets, urinals, and the like, such that when a user actuates a handle, water flows through the flush valve into a basin portion and out the drain.

A common type of flush valve is a diaphragm flush valve. Such a diaphragm flush valve is disclosed in U.S. Pat. No. 4,327,891 to Allen et al., herein incorporated by reference. The Allen patent discloses the use of a diaphragm in a flush valve, where the diaphragm is made of molded rubber and serves to effectuate the flow of water from a water inlet, through the valve, and to a water outlet. Further, the Allen patent sets forth various components and sub-components of a conventional flush valve.

Such diaphragm flush valves have several drawbacks. For example, the relatively small by-pass orifice positioned in the diaphragm can become clogged with debris, which prevents water from flowing into an upper chamber located in the flush valve. This causes the flush valve to remain open, resulting in constant water flow. In addition, the flushing cycle of the diaphragm flush valve takes approximately seven seconds to complete, depending upon the flow rates and pressure of the water entering the valve, due to the design of the diaphragm of the flush valve. Since an upper chamber fills slowly, the valve is slowly "shutting off". Therefore, a significant amount of water is wasted through the trap and sewer line during the sealing process of the valve. Yet another drawback is that conventional diaphragm flush valves are impacted at water pressures below 35 psi, since sealing of the valve based on the water pressure against the diaphragm is difficult with such lower water pressure. A need, therefore, exists for a valve replacement element that can effectively be retrofitted into a flush valve that does not have the drawbacks associate with conventional diaphragm flush valves. A further need exists for a flush valve having improved sealing features.

SUMMARY OF THE INVENTION

In accordance with one embodiment of the present invention, a rigid piston assembly is used as a replacement element in a flush valve having a valve body with a fluid inlet, a fluid outlet, an outer cover, and a handle member. The rigid piston assembly includes a rigid piston with a central opening and a by-pass orifice. The rigid piston is mounted within the valve body and is adapted to move axially in the direction of the flow of water from the fluid inlet to the fluid outlet. The rigid piston can further include guide members that maintain the alignment of the rigid piston within the valve during operation as well as a flow ring that gauges the amount of water to be flushed during operation.

A relief valve can be positioned through the central opening of the rigid piston. The relief valve includes an auxiliary valve and a shaft extending from the auxiliary valve. The relief valve can also include a sleeve surrounding the shaft that is adapted to move along the shaft. A seal ring can be positioned between the relief valve and the rigid piston.

A top closure may be connected to the valve body at an end opposite the fluid outlet. The top closure can include an internal cylindrical cap and the outer cover of the flush valve. In another embodiment, the top closure can be a one-piece cylindrical cover. In yet another embodiment, the top closure can include a cylindrical member and a locking ring. The top closure can be made of a plastic or metal.

A piston seal having a by-pass orifice can be fixedly engaged to the rigid piston and sealingly engaged to the valve body near an entrance of the fluid outlet. The piston seal can have an annular skirt that is adapted to extend out toward the top closure and form a seal with the top closure. The rigid piston assembly can also include a retaining ring. The retaining ring can have a by-pass orifice and can be adapted to fixedly engage with the piston seal. The retaining ring can include a plurality of channels that are smaller in diameter than the by-pass orifice of the retaining ring.

A by-pass device having a body with a first end, a second end, and a passageway located within the body can be placed through the by-pass orifices of the rigid piston, the piston seal, and the retaining ring, thereby establishing fluid communication between the fluid inlet and an upper chamber formed between the rigid piston and the top closure. When the upper chamber is relieved of pressure, fluid from the fluid inlet forces the rigid piston to axially move in a direction opposite the fluid outlet permitting fluid flow through the fluid outlet. Alternatively, the retaining ring is smaller in size and does not contain a by-pass orifice. In this embodiment, a central opening of the retaining ring can be adapted to fixedly engage directly to the by-pass device.

The rigid piston assembly can further include a sealing component that is placed into the valve body forming a seal between the top closure and the valve body. The sealing component can be an O-ring.

In accordance with another embodiment of the present invention, a method of retrofitting a rigid piston into a flush valve having a diaphragm assembly generally includes removing the outer cover from the valve body, removing the diaphragm valve assembly from the valve body, inserting a rigid piston into the valve body, incorporating a relief valve into the rigid piston, and attaching a top closure to the valve body at an end opposite the fluid outlet. The rigid piston includes a piston seal attached to a portion of the rigid piston and a by-pass device positioned inside by-pass orifices located in the rigid piston and the piston seal. The rigid piston can also include a retaining ring attached to the piston seal. The retaining ring can have a by-pass orifice and the by-pass device can also be adapted to fit inside the by-pass orifice of the retaining ring. Alternatively, the retaining ring is smaller in size and does not contain a by-pass orifice. In this embodiment, a central opening of the retaining ring can be adapted to fixedly engage directly to the by-pass device.

The rigid piston is adapted to move axially in the direction of the flow of water from the fluid inlet to the fluid outlet. The method can further include placing a seal ring between the relief valve and the rigid piston, and placing a sealing component between the top closure and valve body.

In accordance with yet another embodiment of the present invention, a flush valve for a plumbing fixture includes a fluid inlet in fluid communication with a fluid source, a fluid outlet in fluid communication with a plumbing fixture, a top closure positioned at an end opposite the fluid outlet, and a piston valve for regulating fluid flow between the fluid inlet and the fluid outlet. The piston valve includes a rigid piston with a central opening and a by-pass orifice. The rigid piston is adapted to move axially in the direction of the flow of water from the fluid inlet to the fluid outlet. The rigid piston can further include guide members that maintain the alignment of the rigid piston within the valve during operation as well as a flow ring that gauges the amount of water to be flushed during operation.

A relief valve is positioned through the central opening of the rigid piston. The relief valve includes an auxiliary valve and a shaft extending from the auxiliary valve. The relief valve can also include a sleeve surrounding the shaft that is adapted to move about the shaft. A seal ring is positioned between the relief valve and the rigid piston.

The top closure can include an internal cylindrical cap and the outer cover of the flush valve. Alternatively, the top closure can be a one-piece cylindrical cover. In yet another embodiment, the top closure can include a cylindrical member and a locking ring.

A piston seal having a by-pass orifice is fixedly engaged to the rigid piston and sealingly engaged to the valve body near an entrance of the fluid outlet. The piston seal can have an annular skirt that is adapted to extend out toward the top closure and form a seal with the top closure. The flush valve can also include a retaining ring having a by-pass orifice and can be fixedly engaged to the piston seal. The retaining ring can include a plurality of channels that are smaller in diameter than the by-pass orifice of the retaining ring.

A by-pass device having a body with a first end, a second end, and a passageway located within the body is positioned inside the by-pass orifices of the rigid piston, the piston seal, and the retaining ring. Alternatively, the retaining ring is smaller in size and does not contain a by-pass orifice. In this embodiment, a central opening of the retaining ring can be adapted to fixedly engage directly to the by-pass device. The flush valve can also include a sealing component that forms a seal between the top closure and the valve body. The sealing component can be an O-ring.

BRIEF DESCRIPTION OF THE DRAWINGS

FIG. 3D is a cross-sectional elevational view of the flush valve of FIG. 3A during a resealing event according to the present invention.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following description. However, it is to be understood that the embodiments described hereinafter may assume many alternative variations and embodiments. It is also to be understood that the specific devices illustrated in the accompanying figures and described herein are simply exemplary and should not be considered as limiting.

Figure 1:
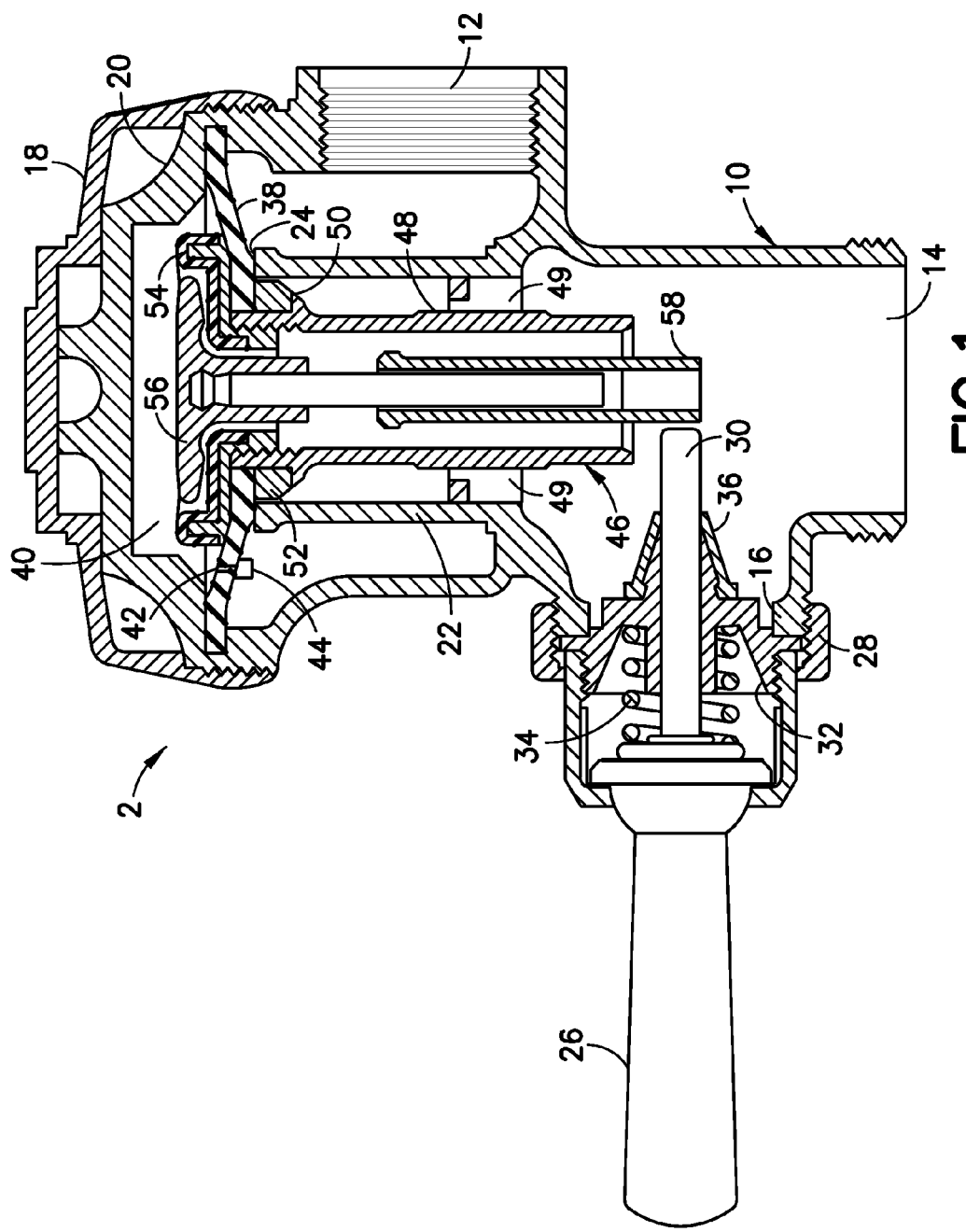
FIG. 1 is a cross-sectional elevational view of an assembled diaphragm flush valve according to the prior art.
Figure 2:
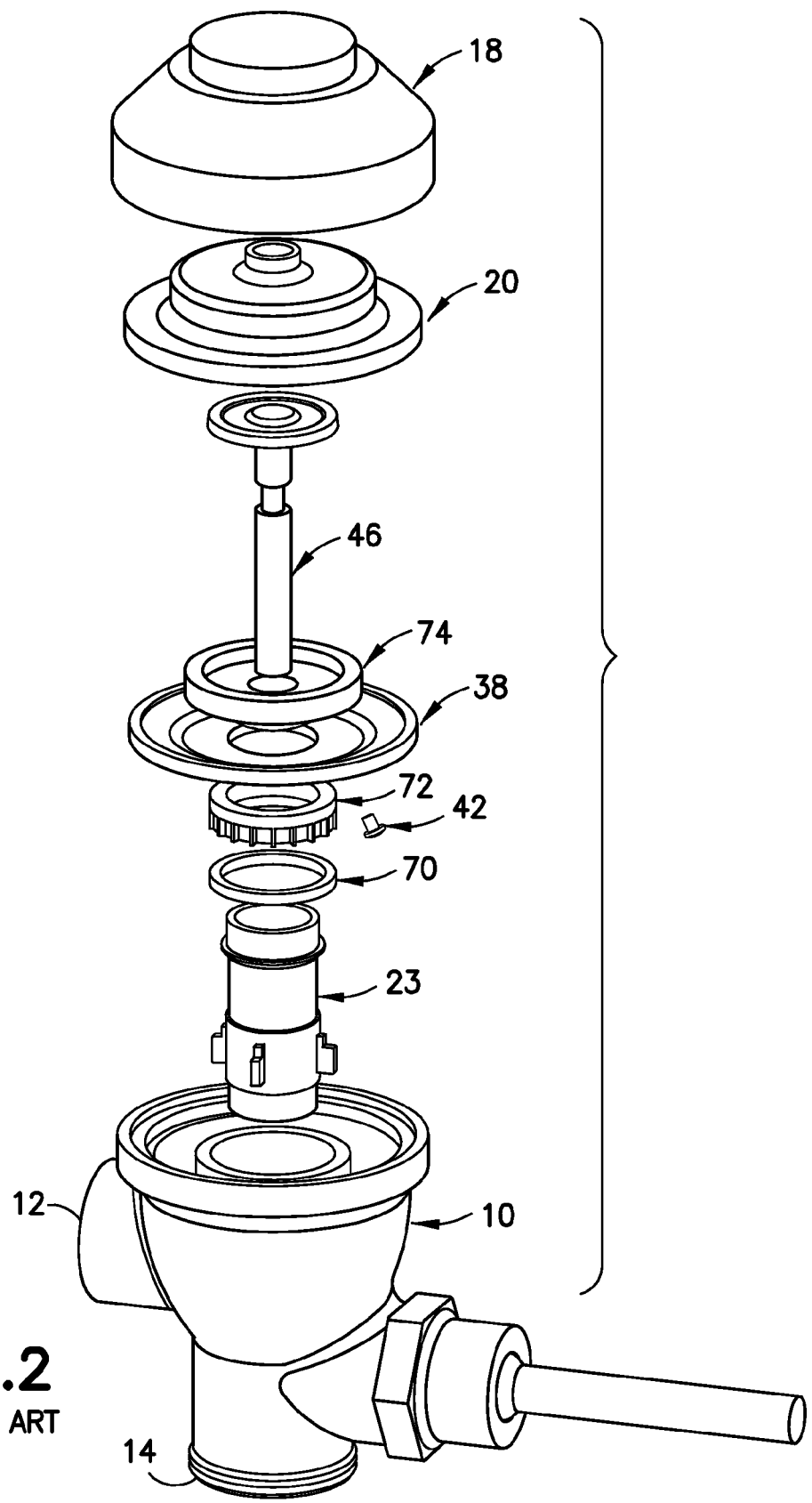
FIG. 2 is an exploded perspective view of the diaphragm flush valve according to FIG. 1.

As shown in FIGS. 1-2, a conventional flush valve 2 has a general hollow valve body 10 which includes a fluid inlet 12, a fluid outlet 14, and a handle coupling connection 16. The top of the valve body 10 is closed by an outer cover 18 and an inner cover 20. The inlet portion of the valve is separated from the outlet portion by an outlet bore 22 which is attached to the inside of the valve body 10. A main valve seat 24 is formed on the top of the outlet bore 22.

The valve is actuated by an operating handle 26 which is fastened to the valve body 10 by means of a coupling nut 28. The handle 26 is connected to a plunger 30 which extends to the interior portion of the valve body 10. The plunger 30 is guided and supported by a bushing 32 and restored by a spring 34. A rubber sealing cap or packing 36 is snapped on the end of bushing 32 and prevents leakage outward from the handle opening.

The main valve seat 24 is normally closed by a flexible rubber diaphragm 38. The flexible rubber diaphragm 38 extends across the valve body 10 and defines an upper chamber 40. The flexible rubber diaphragm includes a by-pass hole 42 which provides fluid communication between the inlet side of the valve and the upper chamber 40. A filter 44 may be provided thereover to prevent clogging of the by-pass hole 42.

The flexible rubber diaphragm 38 is attached at its outer edge to the valve body 10. The outer cover 18 clamps the diaphragm 38 to the valve body 10. The center of the flexible rubber diaphragm 38 has an opening which allows fluid communication between the upper chamber 40 and the fluid outlet 14. A relief valve shown generally at 46 is attached to the flexible rubber diaphragm 38 and normally closes the opening at the center of the flexible rubber diaphragm 38. The relief valve 46 includes a guide portion 48 having wings 49. The wings 49 fit closely against the inside diameter of the outlet bore 22. The guide 48 also has a lip 50. The lip 50 supports a collar 52. The relief valve 46 includes a clamping member 54 which is threadably engaged with the guide portion 48. The clamping member 54 clamps the inner edge of the flexible rubber diaphragm 38 between the clamping member 54 and the collar 52 to form a seal. The clamping member 54 has a hole in the middle which is normally closed by an auxiliary valve member 56. This auxiliary member 56 is connected to a depending stem 58 which extends to a point opposite the actuating plunger 30.

Referring specifically to FIG. 2, a central throat 23 is first placed into the valve body 10. A guide ring 70 is placed around a top portion of the central throat 23, and a flow ring 72 is placed on top of the guide ring 70. The flexible rubber diaphragm 38 is then placed into the valve body 10. A by-pass hole 42 is positioned in the flexible rubber diaphragm 38 and a molded disc 74 is placed onto the flexible rubber diaphragm 38. The relief valve 46 is placed through openings located in the center of the molded disc 74 and diaphragm 38. An inner cover 20 is placed over the diaphragm assembly and an outer cover 18 is placed on top of the inner cover 20. As discussed in detail above, flush valves incorporating a flexible rubber diaphragm 38 have numerous drawbacks. Accordingly, the present invention is directed to a rigid piston 310, as shown in FIG. 4, for use in a conventional flush valve body 10.

Figure 4:
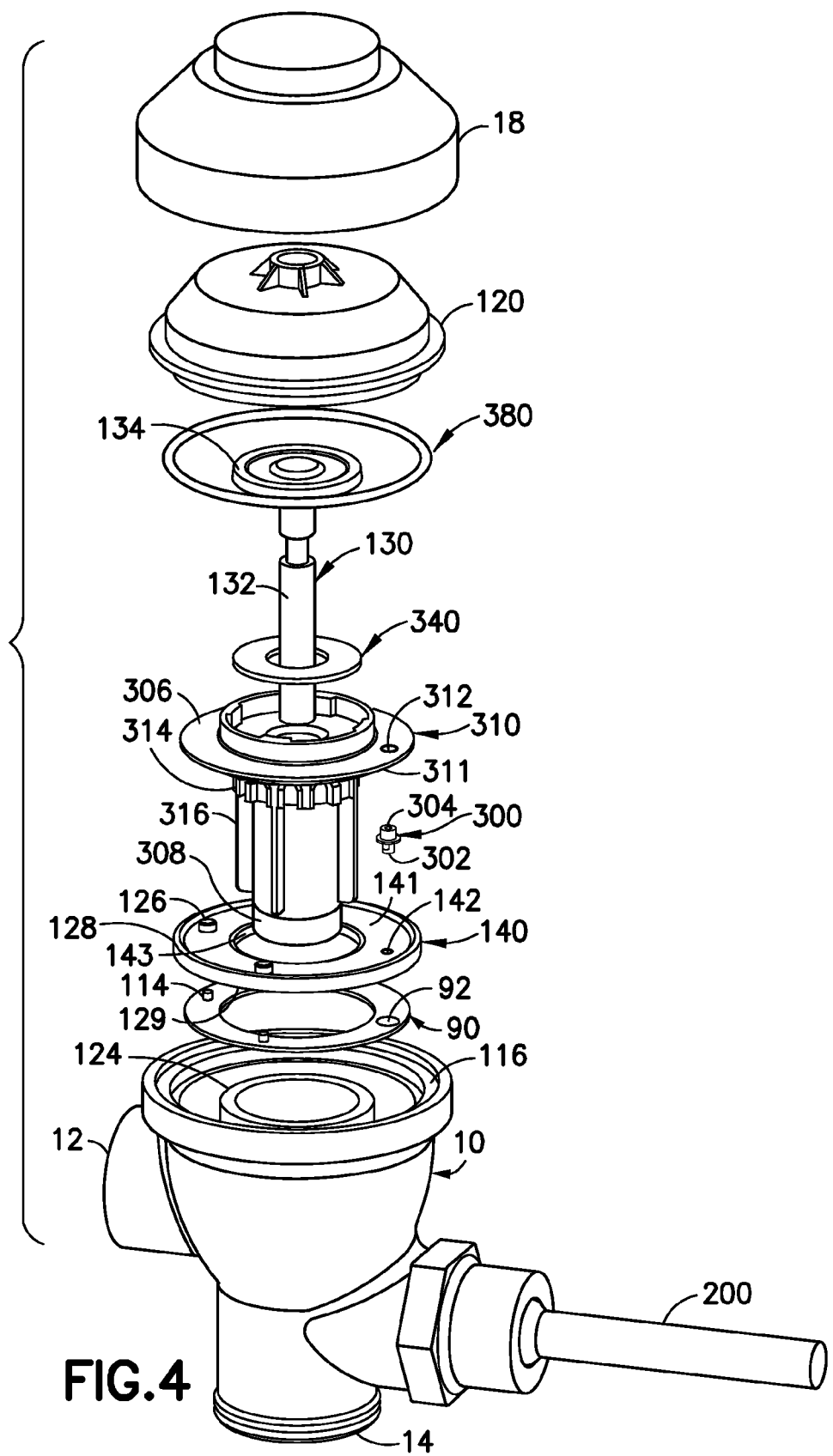
FIG. 4 is an exploded perspective view of the flush valve of FIG. 3A according to the present invention.
Figure 5:
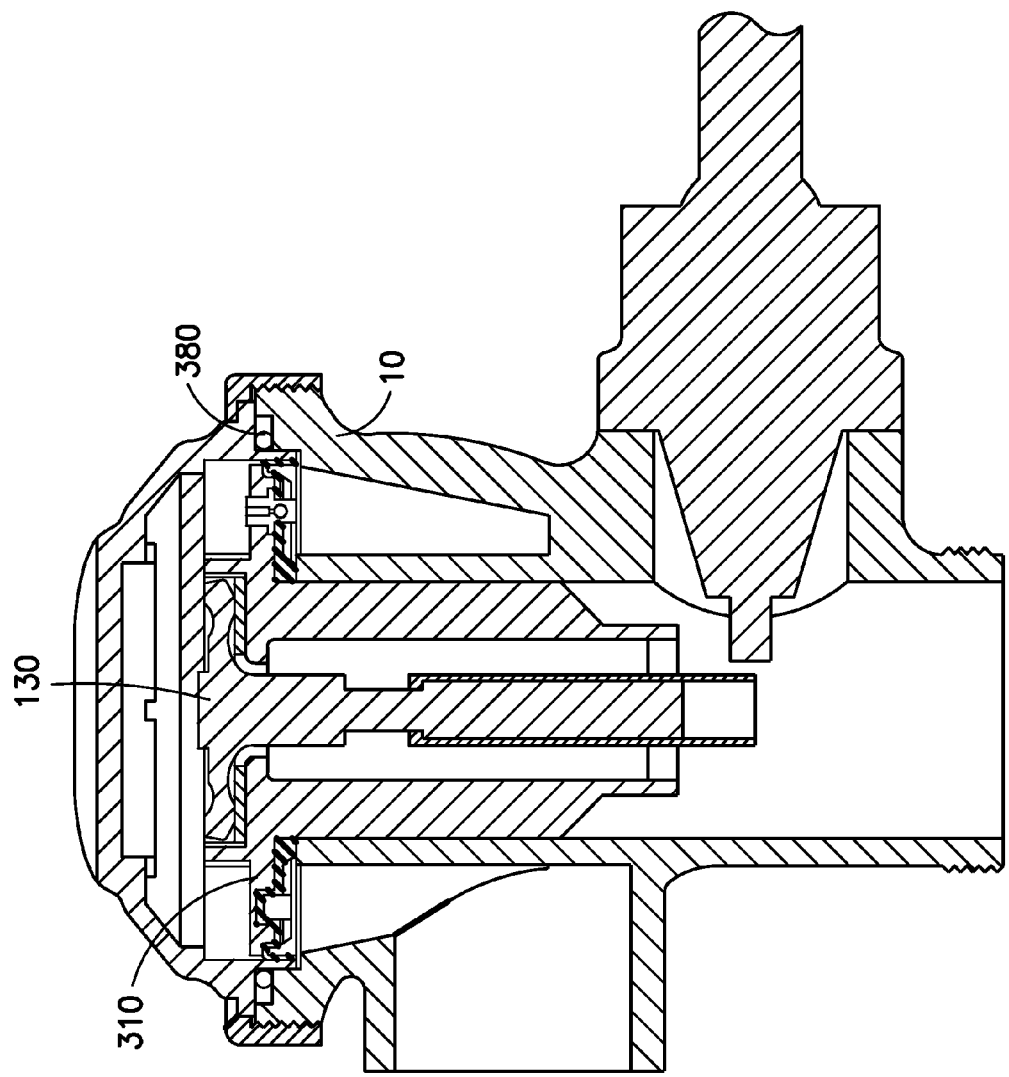
FIG. 5 is a cross-sectional assembled elevational view of the flush valve of FIG. 4 according to the present invention.

As shown in FIGS. 4-5, the present invention includes a rigid piston 310 having a disc shaped member 306 defining a central opening therein and an elongated hollow member 308 that extends from the disc shaped member 306 of the rigid piston 310. The rigid piston 310 sits directly within the hollow valve body 10 providing a mechanism for regulating water flow through the valve body 10.

Figure 3A:
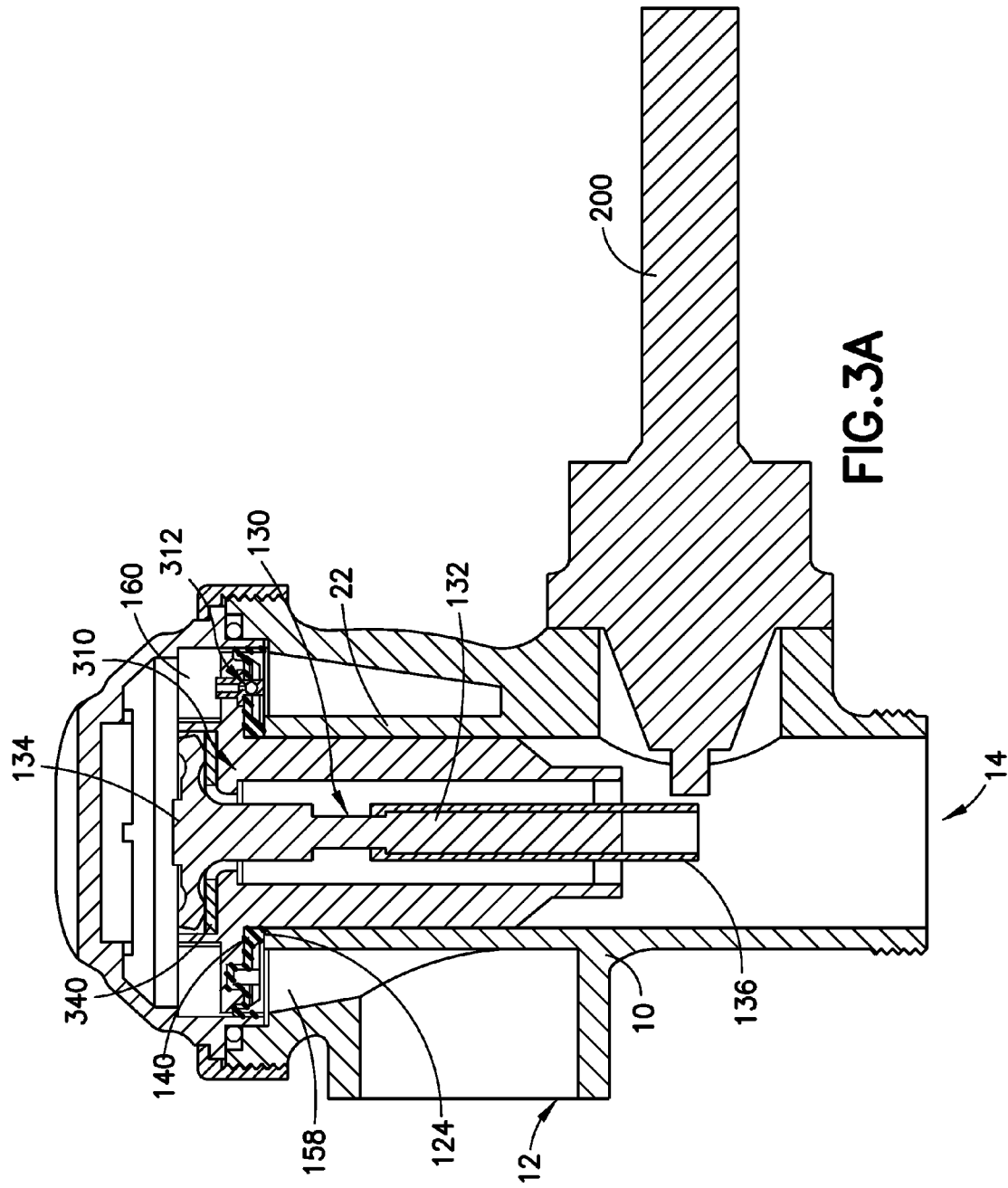
FIG. 3A is a cross-sectional elevational view of a flush valve in a non-activated state according to the present invention.

When placed into the valve body 10, the disc shaped member 306 of the rigid piston 310 sits on top of a central valve seat 124 of the outlet bore 22 and the elongated hollow member 308 extends down into the outlet bore 22. The disc shaped member 306 extends outward from the central seat 124 of the outlet bore 22 to an inside annular shoulder 116 of the valve body 10 creating a lower chamber 158 and an upper chamber 160, as shown in FIG. 3A. The lower chamber 158, located below the disc shaped member 306 of the rigid piston 310 near the fluid inlet 12, is defined between the rigid piston 310, outlet bore 22, and valve body 10. The upper chamber 160, located above the disc shaped member 306 of the rigid piston 310, is defined between the rigid piston 310, the valve body 10, and a top closure that is attached to the valve body 10 at an end opposite the fluid outlet 14.

Figure 8:
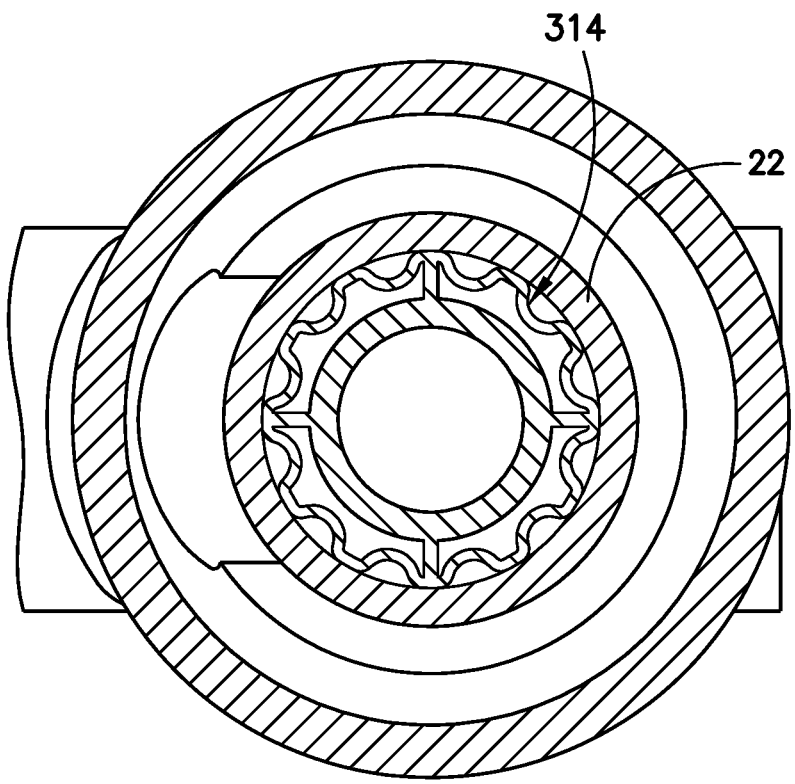
FIG. 8 is a cross-sectional bottom view of the flush valve of FIG. 7 taken along line 8-8 according to the present invention.

The rigid piston 310 can have a scallop shaped flow ring 314 for maintaining a constant water flow area, such as shown in FIG. 8. The flow ring 314 can be attached to the outer surface of the elongated hollow member 308 of the rigid piston 310. During flushing, water flows around the flow ring 314 as it enters the outlet bore 22. The flow ring 314 helps regulate the flow of water during flushing, which allows for a consistent turbulent flow of water during flushing when the rigid piston 310 is incorporated into the valve body 10. A consistent turbulent flow of water through the throat of a toilet helps ensure proper flushing with a sufficient amount of water. The flow ring 314 also ensures a high velocity of flush which allows for a quicker and more efficient flush.

Guide members 316 can also be attached to the elongated hollow member 308 of the rigid piston 310 (see FIG. 4). The guide members 316 extend down the length of the elongated hollow member 308 of the rigid piston 310. When the rigid piston 310 is placed into the valve body 10, the guide members 316 abut the inside wall of the outlet bore 22 securing the elongated hollow member 308 of the rigid piston 310 within the valve body 10. The guide members 316 ride along the inside wall of the outlet bore 22 as the rigid piston 310 moves during operation. This prevents the rigid piston 310 from shifting during operation, thereby maintaining proper alignment of the rigid piston 310 within the valve body 10 at all times. In one embodiment, the flow ring 314 is attached to the guide members 316.

Referring to FIG. 4, a piston seal 140 can be attached to the rigid piston 310. The piston seal 140 can be made of an elastomeric material such as rubber. The piston seal 140 is configured to fixedly engage with the rigid piston 310. For example, an undersurface 311 of the disc shaped member 306 of the rigid piston 310 can be adapted to fixedly engage with a sealing surface 141 of the piston seal 140. In a non-limiting embodiment, as shown in FIG. 4, the undersurface 311 of the disc shaped member 306 of the rigid piston 310 may define cavities (not shown) and the piston seal 140 may include corresponding projections 126, such as barbed projections, that can be placed into the cavities of the rigid piston 310, thereby securing the piston seal 140 to the rigid piston 310. The piston seal 140 can further have an annular skirt 128 that completely surrounds the outer edge of the piston seal 140.

The piston seal 140 is sized and shaped to engage and form a seal with the valve body 10. In one embodiment, the piston seal 140 is designed to engage and form a first seal with the central valve seat 124 of the outlet bore 22 and a second seal with a top closure that is attached to the valve body 10 after the rigid piston 310 is inserted into the valve body 10. For instance, once the piston seal 140 is attached to the rigid piston 310, the rigid piston 310 and piston seal 140 can be placed into the valve body 10. A central sealing ring 143 extending from the piston seal 140 can be placed into the outlet bore 22 of the valve body 10. This engagement forms a first seal around the central valve seat 124 of the outlet bore 22. This helps prevent water from leaking into the fluid outlet 14 from the fluid inlet 12.

The annular skirt 128 of the piston seal 140 can engage the inside of a top closure that is attached to the valve body 10 at an end opposite the fluid outlet 14. For example, the annular skirt 128 may include a sealing edge 129 located at the bottom end of the annular skirt 128 as shown in FIG. 4. As water flows through the fluid inlet 12 into the lower chamber 158 (see FIG. 3A), water pushes up on the piston seal 140. The pressure forces the annular skirt 128 surrounding the piston seal 140 to extend out toward the top closure attached to the valve body 10. The sealing edge 129 of the annular skirt 128 contacts the inside of the top closure and forms a seal between the piston seal 140 and the top closure. This second sealing engagement prevents water in the lower chamber 158 from leaking around the outer portion of the rigid piston 310 into the upper chamber 160.

The dual sealing arrangement described above makes it possible to form separate and distinct seals at two different areas in a flush valve body 10 at the same time with a single piston seal 140. The use of a single sealing member to form multiple sealing engagements in different areas at the same time, allows for an efficient sealing arrangement in a flush valve body 10. It also allows for an easy and fast installation process.

Figure 9:
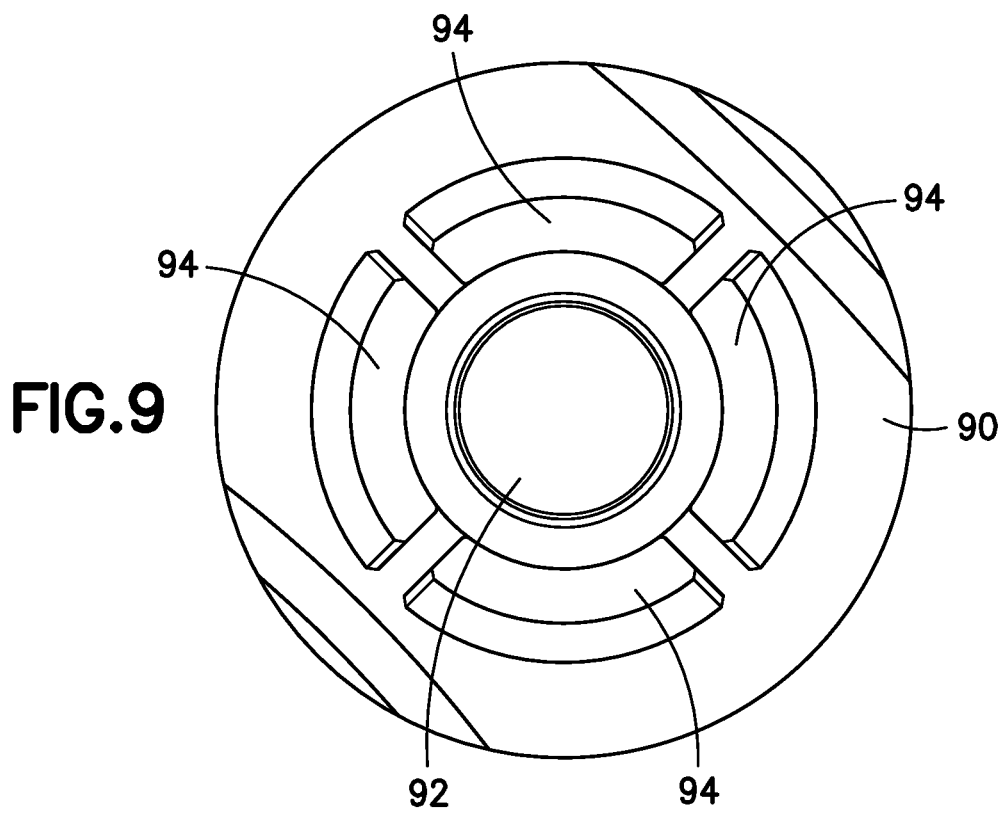
FIG. 9 is a top view of a retaining ring according to the present invention.

Referring again to FIG. 4, the piston assembly can further include a retaining ring 90. As shown in FIG. 4, the retaining ring can be adapted to engage the piston seal 140. For example, in one embodiment, the retaining ring 90 has a plurality of projections 114 that can be placed into corresponding cavities (not shown) located in the piston seal 140, thereby securing the retaining ring 90 to the piston seal 140. As shown in FIG. 9, the retaining ring 90 may include a plurality of channels 94 that are small in diameter, preventing large debris from entering the channels 94.

Figure 11:
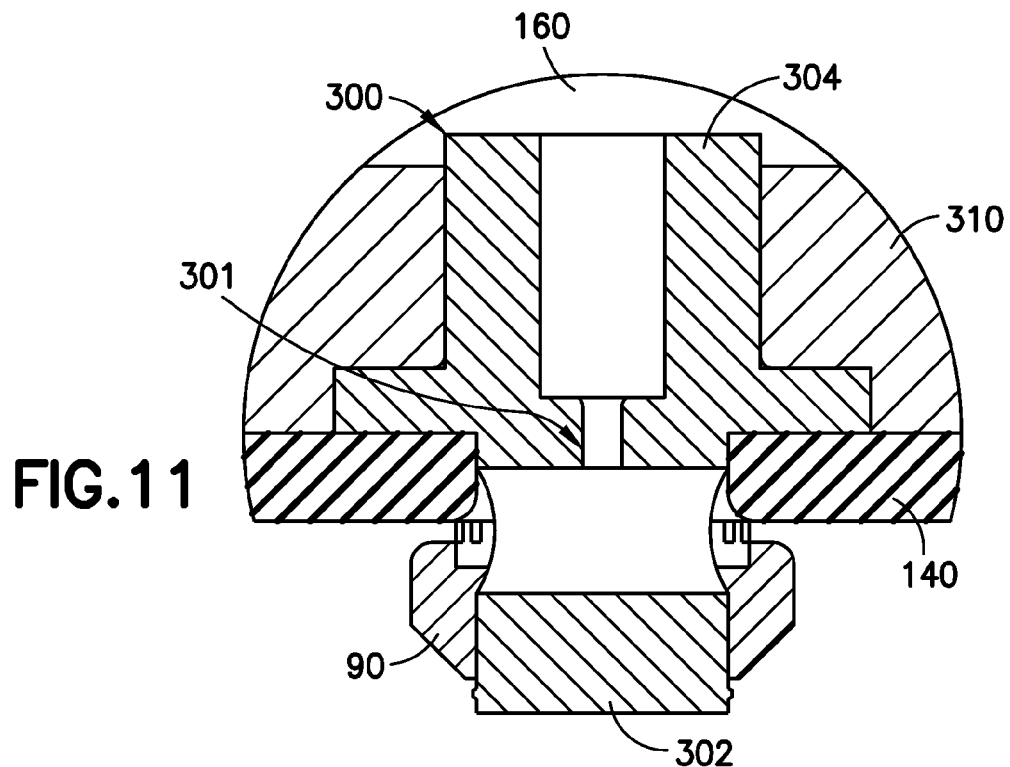
FIG. 11 is a cross-sectional elevation view of a by-pass device with a retaining ring according to another embodiment of the present invention.

In accordance with one embodiment of the present invention as shown in FIG. 4, a by-pass orifice 312 may be defined in the disc shaped member 306 of the rigid piston 310. The piston seal 140 may also include a second by-pass orifice 142. A by-pass device 300 can be placed through the by-pass orifices 312, 142 of the rigid piston 310 and the piston seal 140. The by-pass device 300 includes a body having a first end 302 and a second end 304 (see FIG. 4). The second end 304 of the by-pass device 300 can be placed through the by-pass orifice 312 defined in the rigid piston 310, and the first end 302 of the by-pass device 300 can be placed through the by-pass orifice 142 defined in the piston seal 140. In certain embodiments, when a retaining ring 90 is used, the first end 302 of the by-pass device 300 also can be placed through a by-pass orifice 92 defined in the retaining ring 90. Alternatively, the retaining ring 90 can be smaller in size and does not contain a by-pass orifice 92. In this embodiment, a central opening of the retaining ring 90 can be adapted to fixedly engage directly to the by-pass device 300, as shown in FIG. 11.

Figure 10:
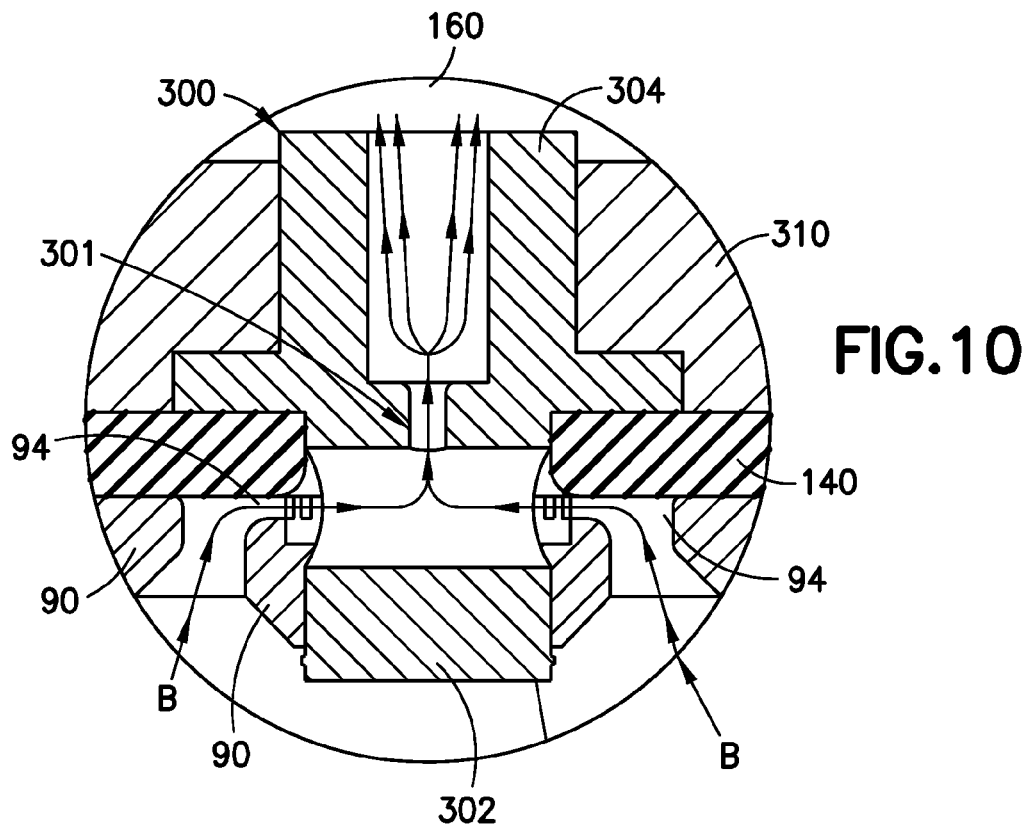
FIG. 10 is a cross-sectional elevational view of a by-pass device according to the present invention.

As shown in FIG. 10, the by-pass device 300 further contains a passageway 301 formed within the body of the by-pass device 300. This passageway 301 connects the lower chamber 158 near the fluid inlet 12 to the upper chamber 160 located above the rigid piston 310. The passageway 301 of the by-pass device 300 is designed so that water can enter through at least one opening located near the first end 302 of the by-pass device 300. The water can then flow from the opening(s) located near the first end 302, through the passageway 301, and out an opening located at the second end 304 of the by-pass device 300. Reference letter "B" in FIG. 10 illustrates the flow of water from the lower chamber 158 to the upper chamber 160 by way of the passageway 301 of the by-pass device 300.

During assembly of one embodiment according to the present invention, the second end 304 of the by-pass device 300 is placed through the by-pass orifice 312 of the rigid piston 310. The piston seal 140 is attached to the rigid piston 310 with the first end 302 of the by-pass device 300 being placed through the by-pass orifice 142 of the piston seal 140. Once placed into the valve body 10, the piston seal 140 forms a seal with the central valve seat 124 of the outlet bore 22 and a top closure that is attached to the valve body 10 after the rigid piston 310 is placed into the valve body 10. This prevents water from entering the fluid outlet 14 and the upper chamber 160 as described above. As a result, water from the fluid inlet 12 can only enter the upper chamber 160 through the by-pass device 300.

In one embodiment, a retaining ring 90 is attached to the piston seal 140 and the first end 302 of the by-pass device 300 is placed through the by-pass orifice 92 of the retaining ring 90. In this embodiment, water cannot enter directly through the by-pass orifice 92 in the retaining ring 90. Instead, water flows through the channels 94 located in the retaining ring 90 and into the opening(s) located near the first end 302 of the by-pass device 300, which then flows out the second end 304 of the by-pass device 300 and into the upper chamber 160 (see FIG. 10).

As shown in FIG. 9, the channels 94 located in the retaining ring 90 are smaller in diameter than the by-pass orifice 92 of the retaining ring 90. This filters out large debris, thereby preventing clogging of the passageway 301 of the by-pass device 300. If smaller debris does clog the channels 94 directly surrounding the by-pass orifice 92 of the retaining ring 90, water can enter through other channels (not shown) positioned in different locations of the retaining ring 90.

Alternatively, in certain embodiments, the retaining ring 90 can be smaller in size and does not contain a by-pass orifice 92. In this embodiment, a central opening of the retaining ring 90 can be adapted to fixedly engage directly to the by-pass device 300 (see FIG. 11).

Referring to FIG. 4, the present invention can further include a relief valve 130 that closes the opening in the center of the rigid piston 310. The relief valve 130 includes an auxiliary valve member 134 having an operating stem 132 that is configured to extend through the elongated hollow member 308 of the rigid piston 310 so that the operating stem 132 is positioned adjacent a handle member such as an actuating rod 200 when placed into the valve body 10. A seal 340, such as a gasket, can be positioned on top of the rigid piston 310 before the relief valve 130 is incorporated into the rigid piston 310. The seal 340 prevents unwanted water from leaking around the relief valve 130 through the opening at the center of the rigid piston 310.

The relief valve 130 can have a sleeve 136, as shown in FIG. 3A, that slides up and down the operating stem 132. The sleeve 136 operates to shut off the valve when the actuating rod 200 is held down for a long period of time. If the actuating rod 200 is held down for a certain period of time, the sleeve 136 will slide up the operating stem 132 and sit on top of the actuating rod 200. The next flush cannot be actuated until the sleeve 136 is back to its normal position.

As mentioned above, a top closure is placed onto the valve body 10 after the rigid piston 310 is installed in order to cover the top of the flush valve body 10. In one embodiment, referring to FIG. 4, the top closure includes an internal cylindrical cap 120 and the outer cover 18 previously used with the diaphragm flush valve. The cylindrical cap 120 is placed into the valve body 10 next to the rigid piston 310. The cap 120 can be made of any rigid material including various types of plastics and metals. In addition, the surface of the cap 120 contains the required lubricity to easily slide into the valve body 10. Once inserted into the valve body 10, the cylindrical cap 120 further secures the piston 310 in place and functions as a mechanism limiting the movement of the piston 310 to a consistently steady axial motion within the valve body 10.

A sealing component 380 such as an O-ring or gasket can be positioned into the valve body 10 next to the rigid piston 310. When the cap 120 is inserted into the valve body 10, pressure is applied to the sealing component 380 contained therein, thereby forming a tight seal between the valve body 10 and the cylindrical cap 120.

The outer cover 18 previously used with the diaphragm flush valve is placed over the cylindrical cap 120. The outer cover 18 attaches to the cylindrical cap 120 and the outer surface of the valve body 10. Once attached to the valve body 10, the outer cover 18 continually exerts force onto the cylindrical cap 120 retaining the cap 120 inside the valve body 10. When a sealing component 380 is placed inside the valve body 10, the outer cover 18 helps supply pressure to form the tight seal between the valve body 10 and cylindrical cap 120.

Figure 6A:
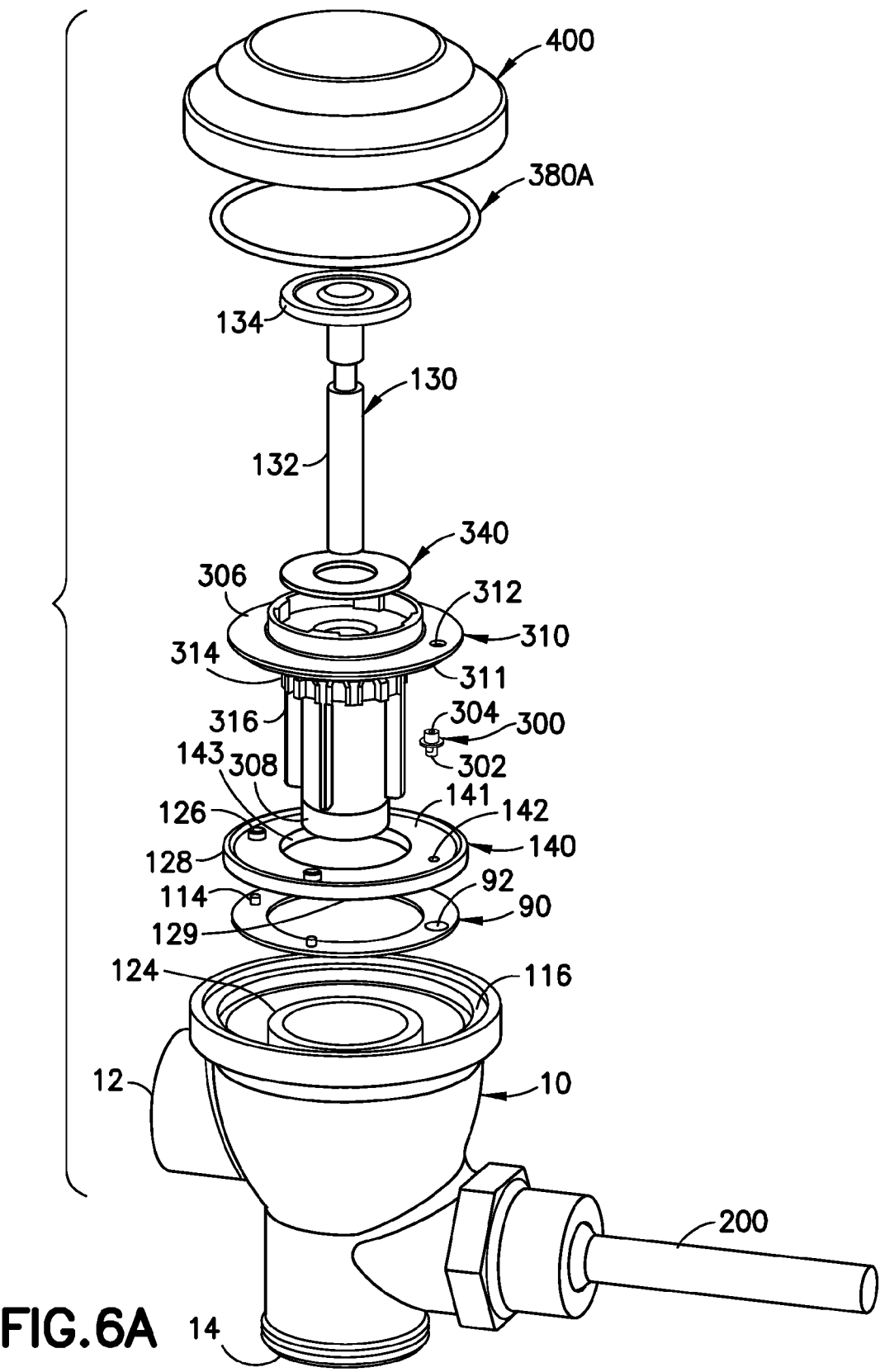
FIG. 6A is an exploded perspective view of a flush valve according to another embodiment of the present invention.
Figure 6B:
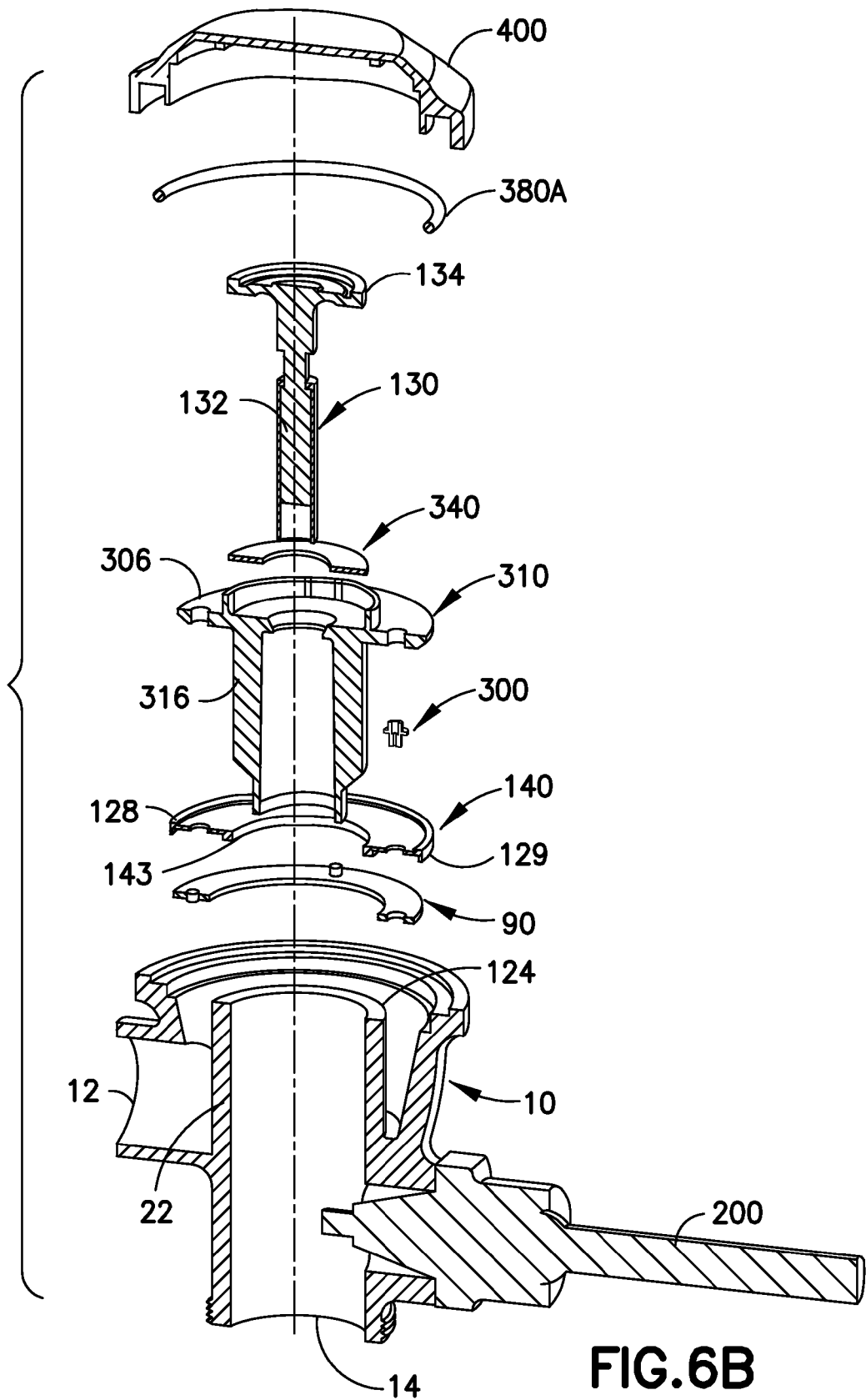
FIG. 6B is an exploded cross-sectional view of the flush valve of FIG. 6A according to the present invention.

In another embodiment shown in FIGS. 6A-6B, the top closure includes a one-piece cylindrical cover 400. In this embodiment, a portion of the cylindrical cover 400 is designed to fit into the valve body 10 to secure the piston 310 in place and to limit the movement of the rigid piston 310 to a consistently steady axial motion within the valve body 10. The cylindrical cover 400 is also configured to attach to the outer surface of the valve body 10. As with the previous embodiment, a sealing component 380A such as an O-ring or gasket can be positioned inside the valve body 10 to form a tight seal between the cylindrical cover 400 and valve body 10. The cylindrical cover 400 can be made of any rigid material including various types of plastics and metals. For instance, the cylindrical cover 400 can be made of chrome.

Figure 7:
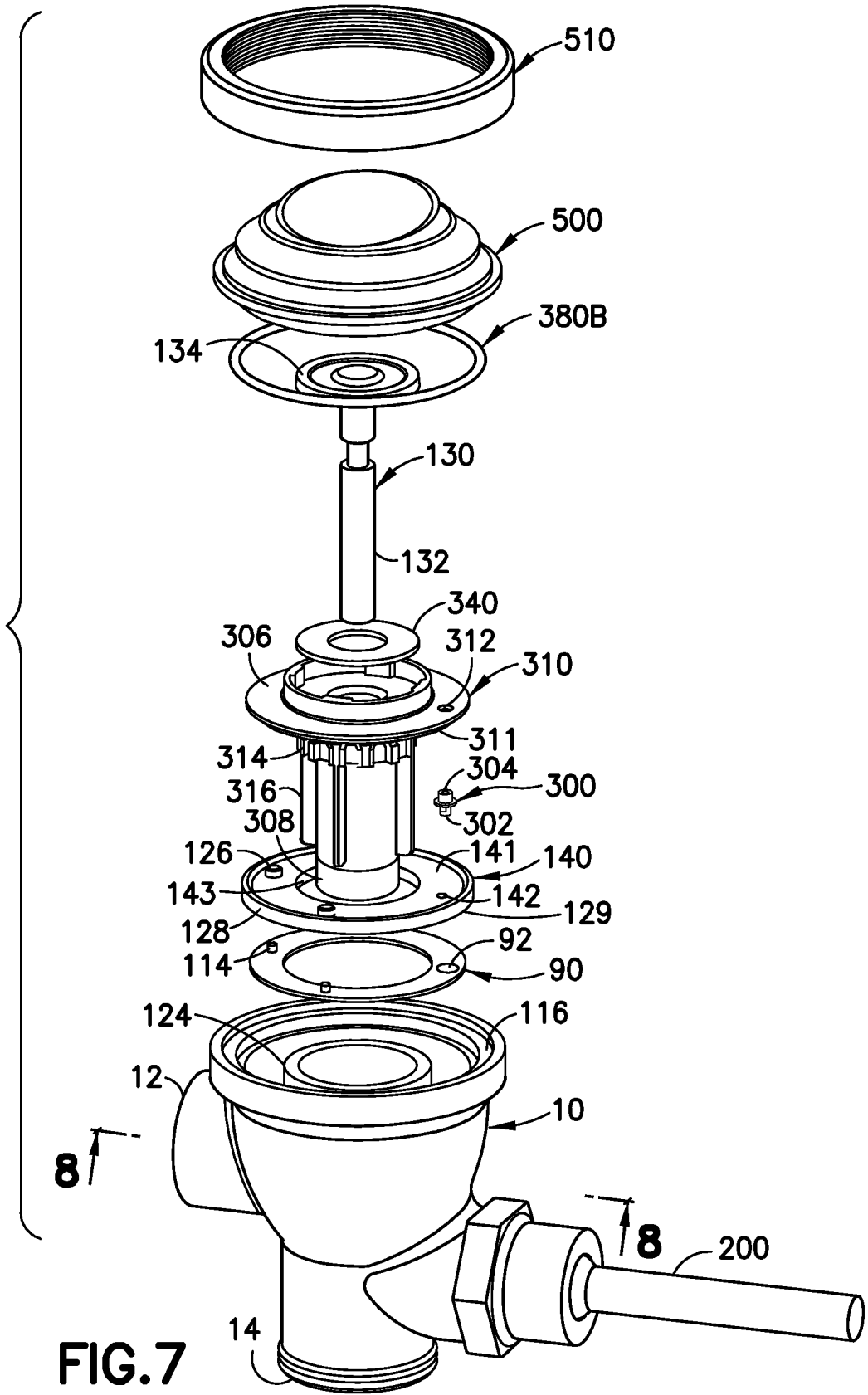
FIG. 7 is an exploded perspective view of a flush valve according to yet another embodiment of the present invention.

In yet another embodiment shown in FIG. 7, the top closure comprises a two-piece top cover including a cylindrical member 500 and a locking ring 510. A portion of the cylindrical member 500 is designed to fit into the valve body 10 to secure the rigid piston 310 in place and to limit the movement of the rigid piston 310 to a consistently steady axial motion within the valve body 10. A sealing component 380B such as an O-ring or gasket can also be positioned inside the valve body 10 to form a tight seal between the cylindrical member 500 and valve body 10. However, the cylindrical member 500 does not attach to the outer surface of the valve body 10. Rather, the locking ring 510 is attached to the outer surface of the valve body 10 and the outer surface of the cylindrical member 500 further securing the cylindrical member 500 to the valve body 10. The locking ring 510 can be designed to attach to any type of valve body 10. The cylindrical member 500 and locking ring 510 can be made of the same material or different materials. For example, both the cylindrical member 500 and locking ring 510 can be made of chrome.

FIG. 3A shows the piston assembly according to one embodiment of the present invention incorporated into the valve body 10 while the flush valve is in a closed steady-state position. The piston seal 140, now attached to the rigid piston 310, engages the central valve seat 124 of the outlet bore 22. Pressure from water flowing through the fluid inlet 12 causes the annular skirt 128, as shown in FIG. 4, to extend outward onto the inside of the top closure, as also shown in FIG. 4, of the valve body 10. The water flowing into the fluid inlet 12 passes through the channels 94 in the retaining ring 90, through the passageway 301 of the by-pass device 300, and into the upper chamber 160 (see FIG. 10). As shown in FIG. 3, the relief valve 130 closes the opening in the center of the rigid piston 310 preventing water from entering the central opening. The pressure in the upper chamber 160 forces the piston 310 down into the piston seal 140, which forces the piston seal 140 onto the central valve seat 124 forming a seal around the outlet bore 22 so that there is no fluid communication between the fluid inlet 12 and fluid outlet 14 channels.

Figure 3B:
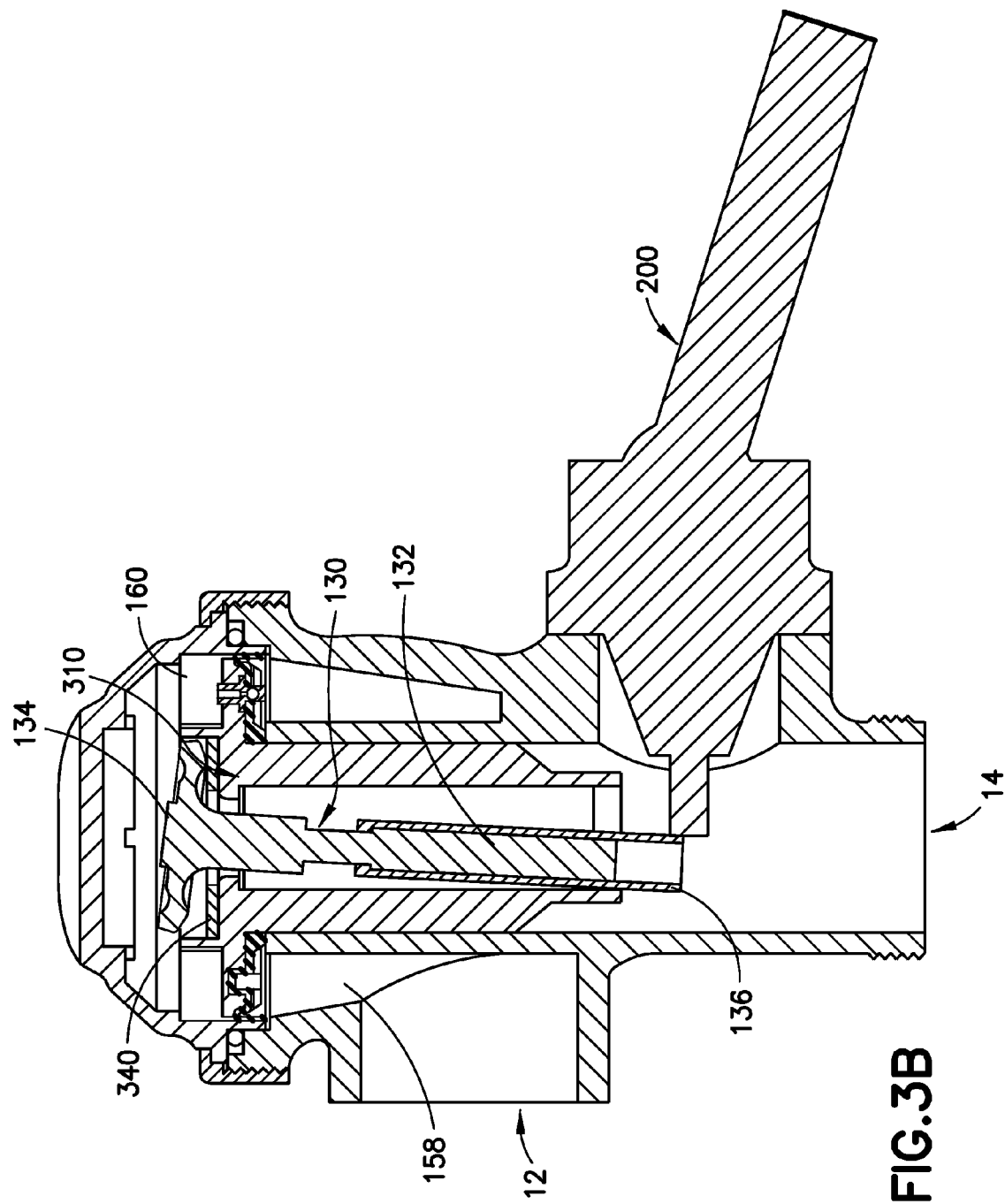
FIG. 3B is a cross-sectional elevational view of the flush valve of FIG. 3A in an activated state according to the present invention.

In operation, as shown in FIG. 3B, the actuating rod 200 is moved causing the actuating rod 200 to contact the sleeve 136 of the operating stem 132 of the relief valve 130. As the operating stem 132 tilts to one side, the auxiliary valve member 134 lifts off of the opening located in the center of the piston 310, thereby relieving the pressure from the upper chamber 160 by allowing water to flow to the outlet 14. Inlet water pressure forces the piston 310 to move axially upwards off of the central valve seat 124 in a direction opposite the fluid outlet 14. The guide members 316 attached to the elongated hollow member 308 of the rigid piston 310 ride along the inside wall of the outlet bore 22 maintaining proper alignment of the rigid piston 310 as it moves off the central valve seat 124.

Figure 3C:
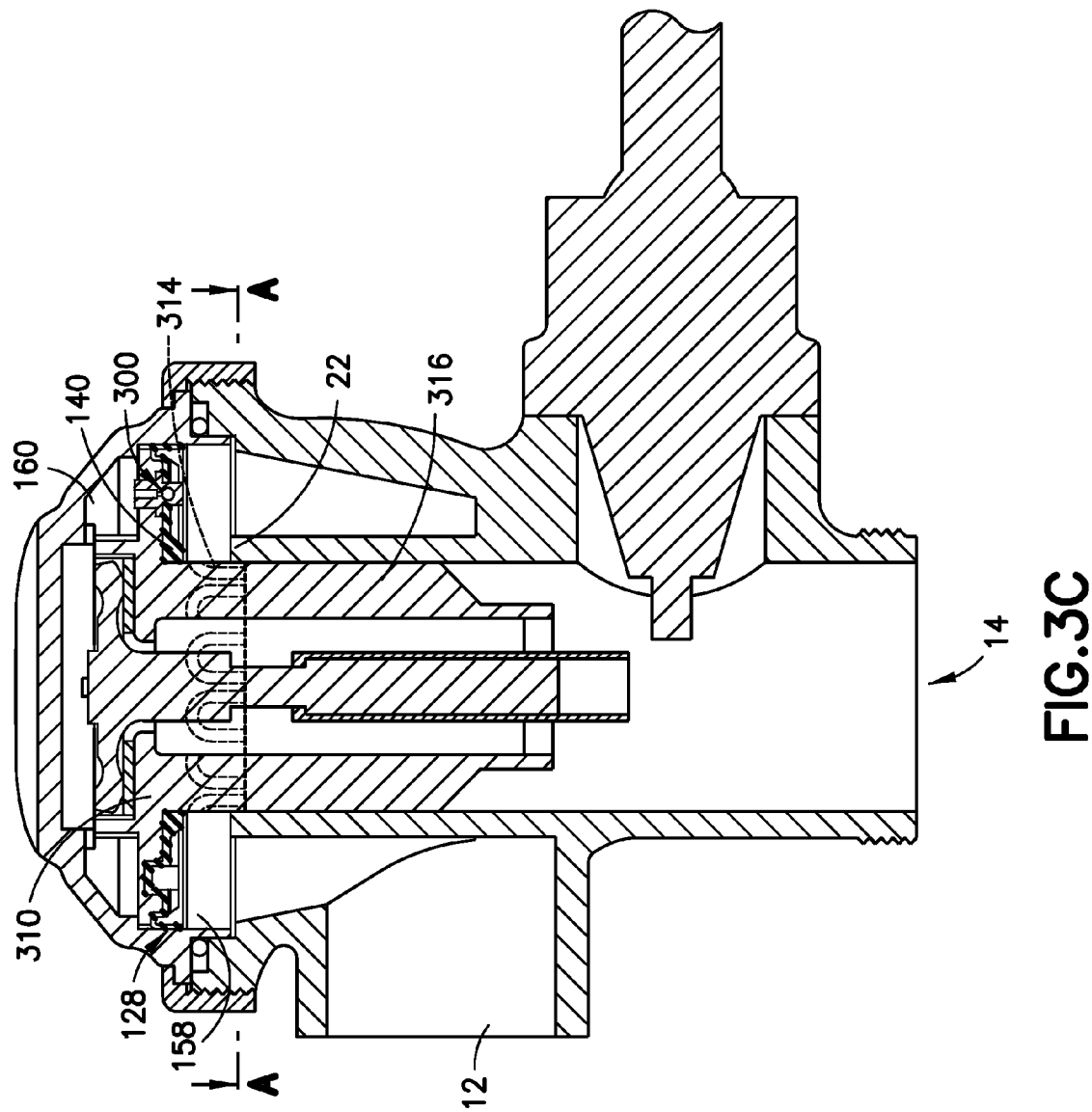
FIG. 3C is a cross-sectional elevational view of the flush valve of FIG. 3A during a flushing event according to the present invention.

During flushing, as shown in FIG. 3C, water flows directly from the fluid inlet 12 into the flow ring 314, which gauges the proper amount of volume to be flushed. The water then continues to the fluid outlet 14 in the direction shown by reference letter "A" in FIG. 3C. As the valve is flushing, the water pressure pushing the rigid piston 310 off the central valve seat 124 is continuing to act on the annular skirt 128 of the piston seal 140. This pressure pushes the annular skirt 128 out towards the top closure that is attached to the valve body 10. This maintains a seal between the lower chamber 158 and upper chamber 160 so that water can only enter the upper chamber 160 through the by-pass device 300. As water flows from the inlet 12 into the outlet 14, water is also flowing through the by-pass device 300 into the upper chamber 160. When the water pressure in the upper chamber 160 is greater than the inlet 12 water pressure, the rigid piston 310 and piston seal 140 are forced back onto the central valve seat 124 in a steady axial motion with the help of the guide members 316 so that there is no fluid communication between the inlet 12 and outlet 14.

As shown in FIG. 3D, if the actuating rod 200 is held down in the activated position for an extended period time, the sleeve 136 attached to the operating stem 132 of the relief valve 130 will slide up on top of the actuating rod 200. This will shut the valve off and prevent excessive flushing. The next flush cannot be actuated until the sleeve 136 is again positioned next to the actuating rod 200.

The present invention is also directed to a method of retrofitting a rigid piston 310 into a flush valve body 10. Referring to FIG. 4, the method includes removing the outer cover 18 from the diaphragm flush valve, and then removing the diaphragm valve assembly from the valve body 10. Next, the rigid piston 310 and piston seal 140 are attached to each other with the by-pass device 300 placed within by-pass orifices 312, 142 defined in the rigid piston 310 and piston seal 140. In one embodiment, a retaining ring 90 is attached to the piston seal 140 and the by-pass device 300 is also placed within a by-pass orifice 92 defined in the retaining ring 90. Alternatively, the retaining ring 90 can be smaller in size and does not contain a by-pass orifice 92. In this embodiment, a central opening of the retaining ring 90 can be adapted to fixedly engage directly to the by-pass device 300 (see FIG. 11).

The rigid piston 310 is axially mounted into the valve body 10 and onto the central valve seat 124 of the outlet bore 22. After mounting the rigid piston 310 into the valve body 10, the relief valve 130 is incorporated into and through the rigid piston 310. A seal 340 can be positioned on top of the piston 310 before the relief valve 130 is incorporated into the valve body 10. A top closure is inserted into the valve body 10 at an end opposite the flow outlet 14. A sealing component 380, such as an O-ring, may also be placed into the flush valve body 10.

Accordingly, the present invention, which is directed to a rigid piston 310 that can be used in a conventional flush valve body 10, provides a more efficient flush. Because the by-pass orifice 312 is larger and the rigid piston 310 moves with a consistently steady axial movement, less water is used during the flush cycle. Further still, the present invention can easily be retrofitted into a conventional flush valve body 10 allowing for a fast and cheap installation process.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A rigid piston assembly for use in a flush valve, the flush valve having a valve body with a fluid inlet, a fluid outlet, an outer cover, and a handle member, the rigid piston assembly comprising:

a rigid piston having a central opening and a by-pass orifice, wherein the rigid piston is mounted within the valve body and is adapted to move axially in the direction of the flow of water from the fluid inlet to the fluid outlet;

a relief valve positioned through the central opening of the rigid piston, the relief valve comprising an auxiliary valve and a shaft extending from the auxiliary valve;

a top closure configured to connect to the valve body at an end opposite the fluid outlet;

a piston seal adapted to fixedly engage to the rigid piston and sealingly engage to the valve body near an entrance of the fluid outlet, the piston seal having a by-pass orifice;

a by-pass device having a body with a first end, a second end, and a passageway positioned through the body, wherein the by-pass device is adapted to fit inside the by-pass orifices of the rigid piston and the piston seal, thereby establishing fluid communication between the fluid inlet and an upper chamber formed between the rigid piston and the top closure; and a retaining ring adapted to fixedly engage to the piston seal, wherein the retaining ring comprises a by-pass orifice and the by-pass device is adapted to fit inside the by-pass orifice of the retaining ring.

2. The rigid piston assembly according to claim 1, wherein when the upper chamber is relieved of pressure, fluid from the fluid inlet forces the rigid piston to axially move in a direction opposite the fluid outlet, thereby permitting fluid flow through the fluid outlet.

3. The rigid piston assembly according to claim 1, wherein the top closure comprises an internal cylindrical cap and the outer cover of the flush valve.

4. The rigid piston assembly according to claim 1, wherein the top closure comprises a one-piece cylindrical cover.

5. The rigid piston assembly according to claim 1, wherein the top closure comprises a cylindrical member and a locking ring.

6. The rigid piston assembly according to claim 1, further comprising a sealing component, wherein the sealing component is placed into the valve body forming a seal between the top closure and the valve body.

7. The rigid piston assembly according to claim 1, wherein the top closure is made of a plastic or metal.

8. The rigid piston assembly according to claim 1, wherein the rigid piston further comprises guide members that maintain an alignment of the rigid piston within the valve during operation.

9. The rigid piston assembly according to claim 1, wherein the rigid piston further comprises a flow ring that gauges the amount of water to be flushed during operation.

10. The rigid piston assembly according to claim 1, wherein the relief valve further comprises a sleeve surrounding the shaft of the relief valve that is adapted to move along the shaft.

11. The rigid piston assembly according to claim 1, wherein the piston seal further comprises an annular skirt that is adapted to expand out toward the top closure connected to the valve body and form a seal with the top closure.

12. The rigid piston assembly according to claim 6, wherein the sealing component is an O-ring.

13. The rigid piston assembly according to claim 1, further comprising a seal ring positioned between the relief valve and the rigid piston.

14. The rigid piston assembly according to claim 1, wherein the retaining ring further comprises a plurality of channels that are smaller in diameter than the by-pass orifice of the retaining ring.

15. A flush valve for a plumbing fixture comprising:
a) a fluid inlet in fluid communication with a fluid source;
b) a fluid outlet in fluid communication with a plumbing fixture;
c) a top closure positioned at an end opposite the fluid outlet; and
d) a piston valve for regulating fluid flow between the fluid inlet and the fluid outlet, the piston valve comprising:
a rigid piston having a central opening and a by-pass orifice, wherein the rigid piston is adapted to move axially within the flush valve in the direction of the flow of water from the fluid inlet to the fluid outlet;
a relief valve positioned in the central opening of the rigid piston, the relief valve comprising an auxiliary valve and a shaft extending from the auxiliary valve;
a piston seal fixedly engaged to the rigid piston and sealingly engaged to an entrance of the fluid outlet, the piston seal having a by-pass orifice;
a by-pass device having a body with a first end, a second end, and a passageway located within the body, wherein the by-pass device is positioned through the by-pass orifices of the rigid piston and the piston seal, thereby establishing fluid communication between the fluid inlet and an upper chamber formed between the rigid piston and the top closure; and
a retaining ring adapted to fixedly engage to the piston seal, wherein the retaining ring comprises a by-pass orifice and the by-pass device is adapted to fit inside the by-pass orifice of the retaining ring.

16. The flush valve according to claim 15, wherein when the upper chamber is relieved of pressure, fluid from the fluid inlet forces the rigid piston to axially move in a direction opposite the fluid outlet, thereby permitting fluid flow through the fluid outlet.

17. The flush valve according to claim 15, wherein the top closure comprises an internal cylindrical cap and the outer cover of the flush valve.

18. The flush valve according to claim 15, wherein the top closure comprises a one-piece cylindrical cover.

19. The flush valve according to claim 15, wherein the top closure comprises a cylindrical member and a locking ring.

20. The flush valve according to claim 15, further comprising a sealing component positioned between the top closure and the valve body.

21. The flush valve according to claim 15, wherein the top closure is made of a plastic or metal.

22. The flush valve according to claim 15, wherein the rigid piston further comprises guide members that maintain the alignment of the rigid piston within the valve body during operation.

23. The flush valve according to claim 15, wherein the rigid piston further comprises a flow ring that gauges the amount of water to be flushed during operation.

24. The flush valve according to claim 15, wherein the relief valve further comprises a sleeve surrounding the shaft of the relief valve that is adapted to move along the shaft.

25. The flush valve according to claim 15, wherein the piston seal further comprises an annular skirt that is adapted to expand out toward the top closure connected to the valve body and form a seal with the top closure.

26. The flush valve according to claim 20, wherein the sealing component is an O-ring.

27. The flush valve according to claim 15, further comprising a seal ring positioned between the relief valve and the rigid piston.

28. The flush valve according to claim 15, wherein the retaining ring further comprises a plurality of channels that are smaller in diameter than the by-pass orifice of the retaining ring.

29. A rigid piston assembly for use in a flush valve, the flush valve having a valve body with a fluid inlet, a fluid outlet, an outer cover, and a handle member, the rigid piston assembly comprising:
a rigid piston having a central opening and a by-pass orifice, wherein the rigid piston is mounted within the valve body and is adapted to move axially in the direction of the flow of water from the fluid inlet to the fluid outlet;
a relief valve positioned through the central opening of the rigid piston, the relief valve comprising an auxiliary valve and a shaft extending from the auxiliary valve;
a top closure configured to connect to the valve body at an end opposite the fluid outlet;

a piston seal adapted to fixedly engage to the rigid piston and sealingly engage to the valve body near an entrance of the fluid outlet, the piston seal having a by-pass orifice;

a by-pass device having a body with a first end, a second end, and a passageway positioned through the body, wherein the by-pass device is adapted to fit inside the by-pass orifices of the rigid piston and the piston seal, thereby establishing fluid communication between the fluid inlet and an upper chamber formed between the rigid piston and the top closure; and a retaining ring adapted to fixedly engage to the by-pass device.

30. A flush valve for a plumbing fixture comprising:
a) a fluid inlet in fluid communication with a fluid source;
b) a fluid outlet in fluid communication with a plumbing fixture;
c) a top closure positioned at an end opposite the fluid outlet; and
d) a piston valve for regulating fluid flow between the fluid inlet and the fluid outlet, the piston valve comprising:

a rigid piston having a central opening and a by-pass orifice, wherein the rigid piston is adapted to move axially within the flush valve in the direction of the flow of water from the fluid inlet to the fluid outlet;

a relief valve positioned in the central opening of the rigid piston, the relief valve comprising an auxiliary valve and a shaft extending from the auxiliary valve;

a piston seal fixedly engaged to the rigid piston and sealingly engaged to an entrance of the fluid outlet, the piston seal having a by-pass orifice;

a by-pass device having a body with a first end, a second end, and a passageway located within the body, wherein the by-pass device is positioned through the by-pass orifices of the rigid piston and the piston seal, thereby establishing fluid communication between the fluid inlet and an upper chamber formed between the rigid piston and the top closure; and a piston valve further comprises a retaining ring adapted to fixedly engage to the by-pass device.

* * * * *